(No Model.) 2 Sheets—Sheet 2.
W. L. WALLIS.
GAS PURIFIER FOR BLAST FURNACES.
No. 533,762. Patented Feb. 5, 1895.
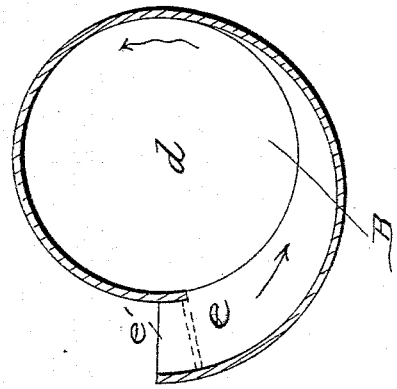
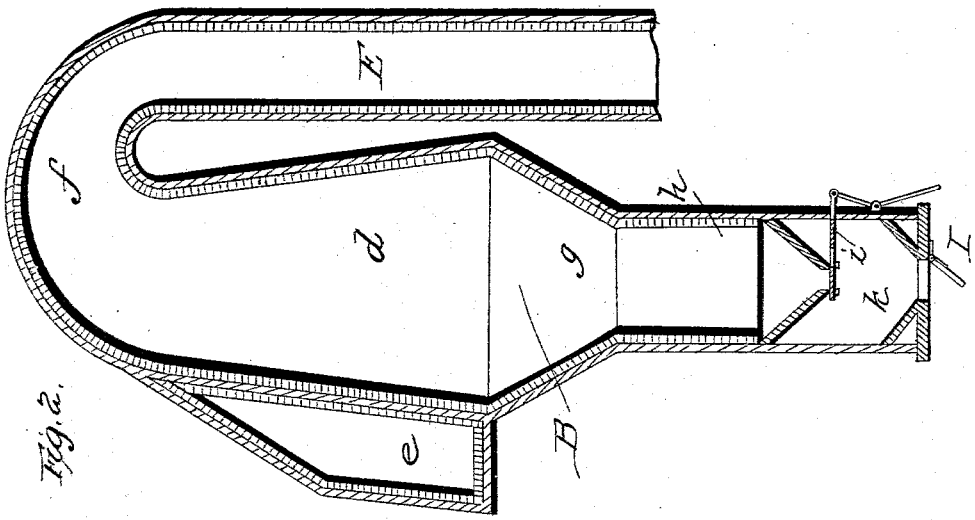

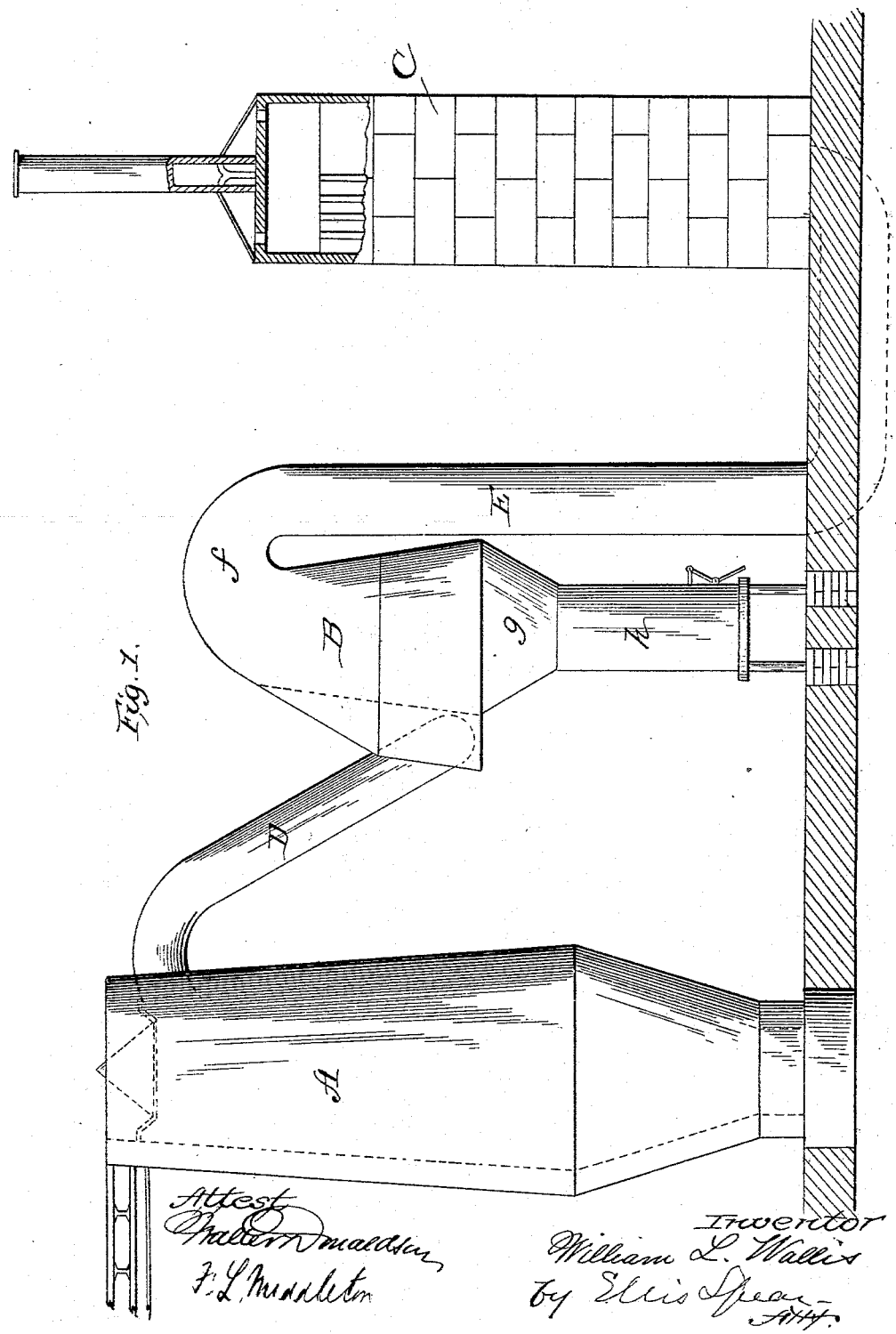

UNITED STATES PATENT OFFICE.

WILLIAM L. WALLIS, OF SHARON, PENNSYLVANIA.

GAS-PURIFIER FOR BLAST-FURNACES.

SPECIFICATION forming part of Letters Patent No. 533,762, dated February 5, 1895.

Application filed May 31, 1894. Serial No. 512,973. (No model.)

*To all whom it may concern:*

Be it known that I, WILLIAM L. WALLIS, a citizen of the United States of America, residing at Sharon, in the county of Mercer and State of Pennsylvania, have invented certain new and useful Improvements in Gas-Purifiers for Blast-Furnaces, of which the following is a specification.

It is the object of my invention to utilize the gas generator in blast furnaces, cupolas, smelting furnaces, and gas producers of all kinds, by separating the gas in its passage from the generating chamber to the point of combustion, from all impurities which are detrimental to the stove or furnace in which combustion takes place; and which are also of value as a product, as the impurities consist of fine iron ore and other particles which are thus saved, and which may be again returned to the furnace for further treatment. I have found that a peculiar kind of purifier is necessary in such a combination, as it is essential that the separation shall take place without impeding or interrupting the flow of the gas through the purifier to the point of combustion, and at the same time, that the separation which takes place shall be perfect.

To successfully carry out the objects of the invention I have interposed between the chamber where the gas is generated and the stove or furnace which presents the point of combustion, a centrifugal purifier with an outlet therefrom for the purified gas, and a receptacle for the fine particles which are separated by the action of the purifier.

My invention therefore consists in a furnace or producer where gas is generated, a stove or furnace where this gas may be consumed, and a centrifugal purifier or separator interposed between the generating chamber and the point of combustion.

Centrifugal separators have been heretofore used in other situations for separating dust from air, known as dust collectors, and I do not broadly claim the use of a centrifugal separator, but so far I am aware, I am the first to utilize a centrifugal separator in the purification of a volume of gas, as it comes from a gas generating chamber, and to deliver this gas to a stove or furnace furnishing a point of combustion.

My invention is illustrated in the accompanying drawings, in which—

Figure 1, represents in side elevation a complete apparatus, which includes my said invention. Fig. 2, shows a vertical central section of the purifier, and Fig. 3, a transverse section of the purifier on line $x$—$x$ of Fig. 1.

In Fig. 1, of the drawings, A represents a blast furnace, B the purifier, and C a stove, the generating furnace and the gas consuming stove being shown as representative of their classes. From the blast furnace, the gases are forced by the tuyeres through the flues D down to the purifier. These gases are generated in the ordinary blast furnace or in like furnaces by the combustion of the stock, and are forced by the blast to the stove or boiler furnace, where they are used as fuel. In passing from the furnace stack, they carry with them fine particles of ore, coke and other products of combustion in like condition, which are detrimental to and prevent perfect combustion of the gases, and also clog up the pipes and form a deposit of silicate or iron, or like deposits on the hot blast stove, involving also a waste of ore and other stock. Separation of these fine particles from the gases must be accomplished without interfering with the blast, and the results above stated are effected by the particular form of purifier hereinafter described. The purifying chamber is shown at $d$. It is in frusto-conical shape, largest at the base and is provided with a lining capable of withstanding the high heat of the blast. It is provided on one side with a curved entrance $e$, formed by a gradual enlargement on a curve from the periphery of the cone at the base thereof, the construction being such that the current entering at $e'$ is carried in the direction of the arrows around the inner wall of the chamber. The passage from the chamber is normally closed below, as hereinafter explained, and the current therefore rises, continuing to circulate in spiral form around the chamber.

In order that the current may escape without eddies into the down-take E, the upper part of the purifier chamber is joined to the down-take by a curved and gradually diminishing bend $f$, as shown in Fig. 2. The rotary circulation of the gases from bottom to top of the chamber is therefore not interfered with, and the gases pass without obstruction to the stove or furnace C. In the course of this circulation, by reason of the centrifugal force, the fine particles of solid matter are thrown outward and therefore fall to the bottom. The bottom of the chamber $d$ is joined to a reversed truncated cone $g$, to which is connected a pipe $h$, the reversed cone serving to direct the falling particles down to the pipe $h$, and thence to the receptacle below. This pipe is closed by a sliding trap valve $i$ at its mouth and below this is a chamber $k$, which receives the collected dust and is provided with a discharge opening closed by a valve I.

The object of the two valves is to keep the purifier chamber closed, without interfering with the discharge of the solid substances eliminated from the gas, and for this purpose, the upper valve is opened, while the lower is closed to allow such substances to fall into the chamber $k$, and at proper intervals the upper valve is closed and the lower opened to discharge the dust accumulating in the receptacle. This permits the furnace to run continuously.

Practically the chamber $d$ is a part of the connection between the gas generator and the gas consumer, and constitutes a centrifugal separator or purifying chamber, which, while it changes the direction of the current, affords it more space, and therefore does not materially check its force, or put any back pressure on the furnace. At the same time its rotary and centrifugal action eliminates the solid particles and causes them to fall by gravity and leaves them to be directed into the proper receptacle.

Preferably I make the flue E larger than the flue D.

It will be understood that not only the purifier chamber but the passages should be lined to resist the heat.

I claim—

1. In combination with a gas generating chamber such as a furnace or gas producer, a stove or furnace adapted to consume the gases therefrom and a centrifugal purifier for the gas interposed between the generator furnace and the consuming stove or furnace, substantially as described.

2. In combination with a gas generating chamber, a consuming stove or furnace, and an interposed gas purifier comprising a separating chamber having a tangential gas inlet, an outlet for the purified gas therefrom, and a normally closed collecting chamber, substantially as described.

3. In combination with a gas generating chamber, a consuming stove or furnace and an interposed gas purifier comprising a separating chamber having a tangential gas inlet, an outlet for the purified gas therefrom and a collecting chamber having a valved entrance and a valved exit, substantially as described.

4. In combination with a blast furnace or generator and a stove, or consumer, the purifier chamber, having the curved inlet passage and the connection with the pipe E, substantially as described, in combination with the reverse cone $g$, the outlet having the valve $i$, the intermediate chamber $h$, and the lower valve I, substantially as described.

In testimony whereof I affix my signature in presence of two witnesses.

WILLIAM L. WALLIS.

Witnesses:
HENRY E. COOPER,
F. L. MIDDLETON.